Patented Sept. 7, 1926.

1,598,638

UNITED STATES PATENT OFFICE.

JOSEPH M. BRAHAM AND FRANKLIN E. ALLISON, OF WASHINGTON, DISTRICT OF COLUMBIA.

FERTILIZER.

No Drawing.   Application filed December 6, 1923.   Serial No. 679,031.

The subject of this invention is a fertilizer and the invention consists essentially in a fertilizer containing, as one of its elements, cyanamid.

Cyanamid is the direct product of the cyanamide process of fixing atmospheric nitrogen and is now being manufactured in very large quantities in many countries for use as fertilizer. Being a direct fixation product, it can be produced at a cost far below that of nitrogen materials made from it such, for example, as ammonium sulphate, and hence it is important to use it as extensively as its agricultural value warrants.

At the present time, the quantity of cyanamid used as fertilizer in this country is relatively small even though sold at a lower price per unit of nitrogen than Chilean nitrate and ammonium sulphate. Two important reasons for such a restricted use are: (1) Cyanamid cannot safely be used in large proportions in mixed fertilizers containing acid phosphate, and (2) cyanamid by itself is a disagreeable materail to handle and apply to the soil because of its dusting properties and its irritating effect on the skin. Our experiments have shown that the use of cyanamid in mixed fertilizers containing acid phosphate is limited to 60 pounds per ton of mixture due to the occurrence of deleterious reactions both in the cyanamid nitrogen and in the phosphate when a larger proportion of cyanamid is used. Only a very small quantity of cyanamid is used by itself as a fertilizer in this country because of the handling difficulties already mentioned. It is thus seen that if large quantities of cyanamid are to be used in American agriculture, new methods of using the material must be devised.

The primary object of this invention is the production of a fertilizer mixture containing cyanamid in any desired proportion without deleterious reactions occurring either in the cyanamid or other materials present in the mixture.

We have found that the objections to the use of cyanamid, which have been mentioned above, can be overcome by using it in mixture with neutral or basic phosphate materials instead of acid phosphate. We make use of calcined phosphate, obtained for example, by calcining a mixture of phosphate rock, an alkali metal salt and carbonaceous matter. Basic phosphate, basic slag or Thomas slag, such as is obtained as a by-product in the manufacture of steel from phosphatic pig-iron; and ground phosphate rock may be used with good results. No appreciable reactions occur between any of these neutral or basic phosphate materials and cyanamid under ordinary conditions of storage and transportation and a product of excellent physical condition is obtained. Complete fertilizers can be made by adding to such mixtures other well known fertilizers such as, for example, potash salts. Such mixtures containing cyanamid can be readily applied to the soil by the methods commonly used at present, and we have found that they are very satisfactory fertilizers, showing especially good results when used for fertilizing some of the more slowly growing crops, such as corn, which are known to thrive even in the absence of the nitrate form of nitrogen.

The term calcined phosphate as used herein refers to a product of the nature of that described in the article entitled "The preparation and chemical nature of calcined phosphate" by E. W. Guernsey and J. Y. Yee, Journal of Industrial and Engineering Chemistry, volume 16, page 228, March 1924.

We claim:—

1. As a fertilizer, a mixture of cyanamid and calcined phosphate obtained by calcining a mixture of phosphate rock, an alkali metal salt and carbonaceous matter.

2. As a fertilizer, a mixture including as ingredients cyanamid and calcined phosphate obtained by calcining a mixture of phosphate rock, an alkali metal salt and carbonaceous matter.

JOSEPH M. BRAHAM.
FRANKLIN E. ALLISON.